United States Patent
Okajima

(10) Patent No.: US 9,224,073 B2
(45) Date of Patent: Dec. 29, 2015

(54) DATA PROCESSOR SAVING DATA INDICATING PROGRESS STATUS OF PRINTING PROCESS RETRIEVABLE BY CLIENT

(75) Inventor: Jun Okajima, Aichi-ken (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 1275 days.

(21) Appl. No.: 12/058,130

(22) Filed: Mar. 28, 2008

(65) Prior Publication Data

US 2008/0239383 A1    Oct. 2, 2008

Related U.S. Application Data

(63) Continuation-in-part of application No. 12/049,919, filed on Mar. 17, 2008, now Pat. No. 8,223,366.

(30) Foreign Application Priority Data

| Mar. 28, 2007 | (JP) | 2007-085187 |
| Apr. 13, 2007 | (JP) | 2007-105538 |
| Feb. 7, 2008 | (JP) | 2008-027275 |

(51) Int. Cl.
*G06F 3/12* (2006.01)
*G06K 15/02* (2006.01)
(Continued)

(52) U.S. Cl.
CPC ............. *G06K 15/02* (2013.01); *G06F 3/1207* (2013.01); *G06F 3/1259* (2013.01); *G06F 3/1274* (2013.01); *G06F 3/1284* (2013.01); *G06K 15/1817* (2013.01); *G06K 15/1821* (2013.01);
(Continued)

(58) Field of Classification Search
CPC ........... G06K 15/02; G06F 9/46; G06F 15/00; G06F 3/12; G06F 3/1296; G06F 3/1297
USPC ......................................... 358/1.13–1.16, 1.1
See application file for complete search history.

(56) References Cited

U.S. PATENT DOCUMENTS

| 2003/0184803 A1 | 10/2003 | Yamada et al. |
| 2004/0003119 A1* | 1/2004 | Munir et al. ................... 709/246 |

(Continued)

FOREIGN PATENT DOCUMENTS

| CN | 1483584 A | 3/2004 |
| JP | 2000-250797 A | 9/2000 |

(Continued)

OTHER PUBLICATIONS

Japanese Patent Office, Japanese Office Action issued in corresponding Japanese Application No. 2007-085187, mailing date Dec. 24, 2008.

(Continued)

*Primary Examiner* — Barbara Reinier
*Assistant Examiner* — Henok A Shiferaw
(74) *Attorney, Agent, or Firm* — Merchant & Gould PC

(57) ABSTRACT

A data processor and a host device are bi-directionally communicably connected to each other. The data processor includes a process-executing unit and a progress-status-saving unit. The process-executing unit executes a prescribed process when a process-requested file is written in a prescribed folder. The progress-status-saving unit saves progress status data indicating a progress status of the prescribed process so that the progress status data is retrievable by the host device.

15 Claims, 13 Drawing Sheets

(51) Int. Cl.
*H04N 1/00* (2006.01)
*H04N 1/32* (2006.01)
*G06K 15/00* (2006.01)

(52) U.S. Cl.
CPC ....... *H04N 1/00236* (2013.01); *H04N 1/00238* (2013.01); *H04N 1/32106* (2013.01); *H04N 2201/0041* (2013.01); *H04N 2201/0049* (2013.01); *H04N 2201/0094* (2013.01); *H04N 2201/3214* (2013.01); *H04N 2201/3215* (2013.01); *H04N 2201/3216* (2013.01); *H04N 2201/3219* (2013.01); *H04N 2201/3221* (2013.01); *H04N 2201/3226* (2013.01); *H04N 2201/3273* (2013.01); *H04N 2201/3274* (2013.01)

(56) References Cited

U.S. PATENT DOCUMENTS

| | | | |
|---|---|---|---|
| 2004/0057073 A1* | 3/2004 | Egawa et al. | 358/1.15 |
| 2004/0135892 A1 | 7/2004 | Maeda | |
| 2004/0196498 A1* | 10/2004 | Klassen | 358/1.15 |
| 2004/0246762 A1 | 12/2004 | Inada | |
| 2004/0257613 A1* | 12/2004 | Okabe et al. | 358/1.15 |
| 2006/0087680 A1* | 4/2006 | Maeda | 358/1.15 |
| 2006/0092453 A1* | 5/2006 | Okada et al. | 358/1.14 |
| 2007/0041040 A1 | 2/2007 | Ozawa | |
| 2007/0156705 A1 | 7/2007 | Tsuya | |
| 2007/0177198 A1* | 8/2007 | Miyata | 358/1.15 |
| 2008/0030780 A1 | 2/2008 | Izawa | |
| 2008/0209006 A1 | 8/2008 | Nakamura et al. | |

FOREIGN PATENT DOCUMENTS

| | | | | |
|---|---|---|---|---|
| JP | 2002-091716 A | | 3/2002 | |
| JP | 2004007517 A | | 1/2004 | |
| JP | 2004-110740 A | | 4/2004 | |
| JP | 2004206302 A | | 7/2004 | |
| JP | 2004-221772 A | | 8/2004 | |
| JP | 2004363825 A | * | 12/2004 | ............... H04N 5/92 |
| JP | 2005-161556 A | | 6/2005 | |
| JP | 20060354448 A | | 2/2006 | |
| JP | 2006227908 A | | 8/2006 | |
| JP | 2007050649 A | | 3/2007 | |
| WO | 2006022271 A1 | | 3/2006 | |

OTHER PUBLICATIONS

Japan Patent Office, Office Action for Japanese Patent Application No. 2008-027275 (counterpart to above-captioned patent application), mailed Sep. 27, 2011.

The State Intellectual Property Office of the People'S Republic of China; First Office Action in Chinese Patent Application No. 2008100876392 (counterpart to the above-captioned U.S. patent application) mailed Oct. 9, 2009 (partial translation).

Chinese Office Action issued in foreign counterpart application No. 201310108157.1, Apr. 28, 2015.

Japan Patent Office; Office Action in Japanese Patent Application No. 2007-085187 (counterpart to the above-captioned U.S. patent application) mailed Jul. 21, 2009.

\* cited by examiner

OOO.ppp is currently printing.
Date received: <time>, <month> <day>, <year>

Printing of OOO.ppp has been canceled because the printer is out of ink. Reprint after replacing the ink.
Date received: <time>, <month> <day>, <year>

OOO.ppp was printed successfully.
Date of completion: <time>, <month> <day>, <year>

OOO.ppp could not be printed because the file format is not the JPEG format or specified company format.
Date received: <time>, <month> <day>, <year>

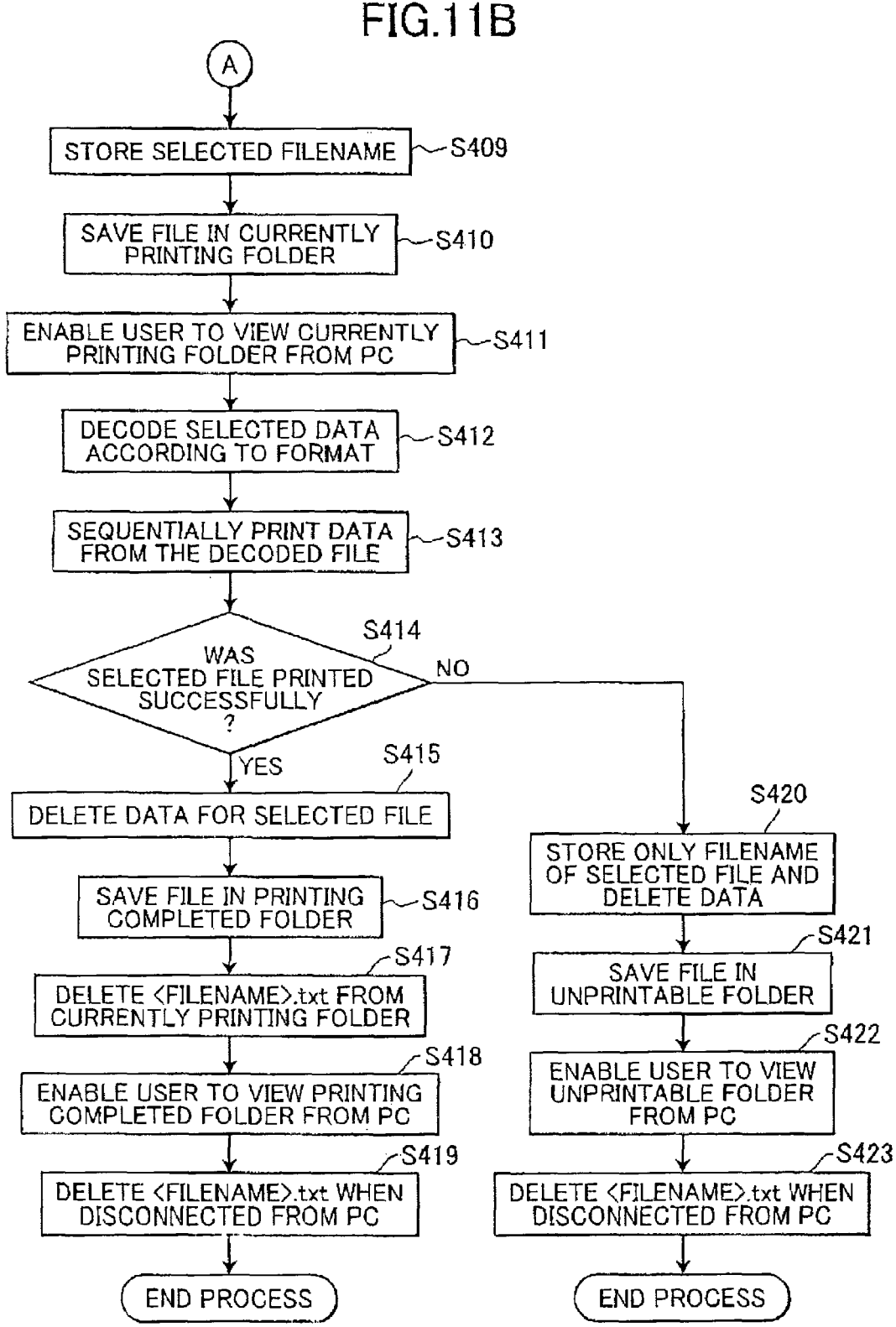

US 9,224,073 B2

DATA PROCESSOR SAVING DATA INDICATING PROGRESS STATUS OF PRINTING PROCESS RETRIEVABLE BY CLIENT

CROSS REFERENCE TO RELATED APPLICATION

This application is a continuation-in-part application of U.S. application Ser. No. 12/049,919 filed Mar. 17, 2008. This application also claims priorities from Japanese patent application Nos. 2007-085187 filed Mar. 28, 2007, 2007-105538 filed Apr. 13, 2007, and 2008-027275 filed Feb. 7, 2008. The entire contents of the priority applications are incorporated herein by reference.

TECHNICAL FIELD

The present invention relates to a data-processing system, and more particularly to a system configured of a device having a server function capable of preparing data regarding the progress status of processes that can be accessed from a device with a client function.

BACKGROUND

Most personal computers (herein Rafter abbreviated as "PC") of recent years have standard client software installed during the manufacturing stage or when an operating system (OS) is installed. Examples of client software are Explorer and Microsoft Internet Explorer (registered trademarks) provided with the Windows (registered trademark) platform.

Through this standard client software, the user of the PC can read files from and write files to a server device, acquire filenames or folder names from the server, or execute other operations without having to install separate software.

This client software includes a function for displaying a window showing filenames and icons representing the files, folder names for folders storing files and icons representing the folders, a tree showing the hierarchical structure of the folders, and the like as a user-friendly way of presenting file and folder data to the user.

Japanese patent application publication No. 2006-227908A discloses a technology involving the installation of an application (direct printing program) on a PC through which application the user can instruct a printer to print a PDF (Portable Document Format) file. The PC user can also receive a report through this application indicating whether the printing operation was a success or a failure.

However, with the conventional technology described above, the user cannot issue a command to print a PDF file or receive a printing report at the PC without installing a prescribed application (the direct printing program).

SUMMARY

In view of the foregoing, it is an object of the invention to provide a technology allowing a user to acquire a user-friendly report giving details of a process performed on a data processor when operating a PC with standard client software installed.

The above and other objects will be attained by a data processor bi-directionally communicably connected to a host device. The data processor includes a process-executing unit that executes a prescribed process when a process-requested file is written in a prescribed folder, and a progress-status-saving unit that saves progress status data indicating a progress status of the prescribed process so that the progress status data is retrievable by the host device.

According to another aspect of the invention, a data-processing system is provided that includes a host device, a data processor bi-directionally communicably connected to the host device, and a progress-status-saving unit. The data processor includes a process-executing unit that executes a prescribed process by writing a process-requested file into a prescribed folder. The progress-status-saving unit saves progress status data indicating the progress status of the prescribed process so that the data is retrievable by the host device. It should be noted that the folders are also referred to as directories.

The prescribed folder may be a specific folder or may be all folders saved in the data processor.

The concept of the prescribed folder is paths managed by the data processor. Hence, it is not necessary to store the process-requested file and associated subfolders, if any, in the prescribed folder on the data processor. This data may be stored on a network storage device or on the host device, for example.

The prescribed process may be a process for printing data on a printing unit or the like in which the data written in the prescribed folder is processed. Alternatively, the prescribed process may be a process for scanning an original document with a scanning unit or a configuration process, for example, in which command data written in the prescribed folder is interpreted and the corresponding commands are issued to components of the data processor.

The progress-status-saving unit may save the progress status data indicating the progress status of the prescribed process in a storage device that the host device can access, or may save location data specifying the location of the progress status data so that the host device can access the progress status data via the location data. The progress-status-saving unit may also create the progress status data when the host device attempts to access this data.

With the data processor of the invention, the user of the host device can instruct the data processor to perform the prescribed process. This can be done by, for example, transmitting the process-requested data from the host device to the prescribed folder. Further, the host device can acquire the progress status data saved in the data processor and can output a report on the progress status for the user.

The progress status of the prescribed process may be represented by at least one of a filename of the progress status data, a folder name in which the progress status data is saved, and a file content of the progress status data. With the data processor thus organized, the user of the host device can acquire a report on the progress status outputted by the host device by acquiring the filename, folder name, or file content from the data processor.

The progress-status-saving unit may save the progress status data in the prescribed folder in which the process-requested file is written. With the data processor thus organized, the user of the host device can acquire a report on the progress status outputted by the host device simply by accessing the prescribed folder in which the process-requested file has been written.

The progress status of the prescribed process may be classified into a plurality of categories, and the progress-status-saving unit may save the progress status data in a folder identified by a category of the process status data. Further, the progress-status-saving unit may create a plurality of folders in one-to-one correspondence with the plurality of categories. With the data processor thus organized, the user of the host device can learn the progress status of a desired category simply by accessing the folder for that category. Also, the user of the host device can learn which folder must be accessed in order to view the progress status in a prescribed category simply by checking the folder structure.

A file-controlling unit may further be provided in the data processor for preventing the host device from deleting or modifying the process-requested file written in the prescribed folder during a period of time from a start of execution until a completion of execution of the prescribed process.

Generally, the data processor is provided with a function for deleting and modifying files based on a request to delete or modify files received from the host device. The data processor of the invention can prevent files from being deleted or modified when undergoing a process.

According to yet another aspect of the invention, there is provided a computer program product including a computer usable medium having readable program code embodied in the medium, the computer program product including a least one component to: instruct execution of a prescribed process when a process-requested file is written in a prescribed folder of a data processor bi-directionally communicably connected to a computer that runs in accordance with the computer program; and save progress status data indicating a progress status of the prescribed process; and allow the computer to retrieve the progress status data.

With the computer program product of the invention, the user of the computer may command the data processor to perform the prescribed process by, for example, transmitting process-requested data to the prescribed folder of the data processor. The user can also acquire a report on the progress status outputted by the computer simply by using the computer to acquire data indicating the progress of a process known by the data processor.

BRIEF DESCRIPTION OF THE DRAWINGS

The particular features and advantages of the invention as well as other objects will become apparent from the following description taken in connection with the accompanying drawings, in which:

FIGS. 6A to 6D are explanatory diagrams each illustrating the content of a file indicating the progress status for direct printing;

FIGS. 11A and 11B are a flowchart illustrating steps in a direct printing process according to a second embodiment;

DETAILED DESCRIPTION

Next, embodiments of the present invention will be described while referring to the accompanying drawings.

First Embodiment

A data-processing system 1 according to a first embodiment of the invention is constructed of a personal computer (PC) 2 functioning as an external device, and a multifunction peripheral 3 functioning as the data processor.

In the first embodiment, the user of the PC 2 can issue a direct print command for printing an image file by copying the image file into a prescribed folder on the multifunction peripheral 3 using the file copying function provided standard on the PC 2.

Upon receiving a direct print command, the multifunction peripheral 3 proceeds with the printing process and saves a file indicating the printing progress status in a prescribed folder on the multifunction peripheral 3.

Using a file browsing function provided standard on the PC 2, the user of the PC 2 can access the file saved in the prescribed folder of the multifunction peripheral 3 in order to view data indicating the stage of progress in the direct printing operation performed on the multifunction peripheral 3, such as currently printing, printing cancelled, printing completed, and unprintable as shown in FIGS. 4, 5A-5D and 6A-6D.

In the first embodiment, the user can perform direct printing only with image files of the Joint Photographic Experts Group (JPEG) standard (hereinafter referred to as "JPEG files") and image files created on the multifunction peripheral 3 in the PDF format, i.e., PDF files created according to the multifunction peripheral manufacturer's specific format (hereinafter referred to as "vendor format PDF files").

The data-processing system 1 cannot directly print all PDF files, but only PDF files of the vendor format. Hence, when creating the vendor format PDF files, the multifunction peripheral 3 adds header data indicating that the file is a PDF file of the vendor format in order that the type of PDF file can be identified.

<Hardware Structure>

Next, the hardware structure of the data-processing system 1 according to the first embodiment will be described while referring to the accompanying drawings.

Figure 1:
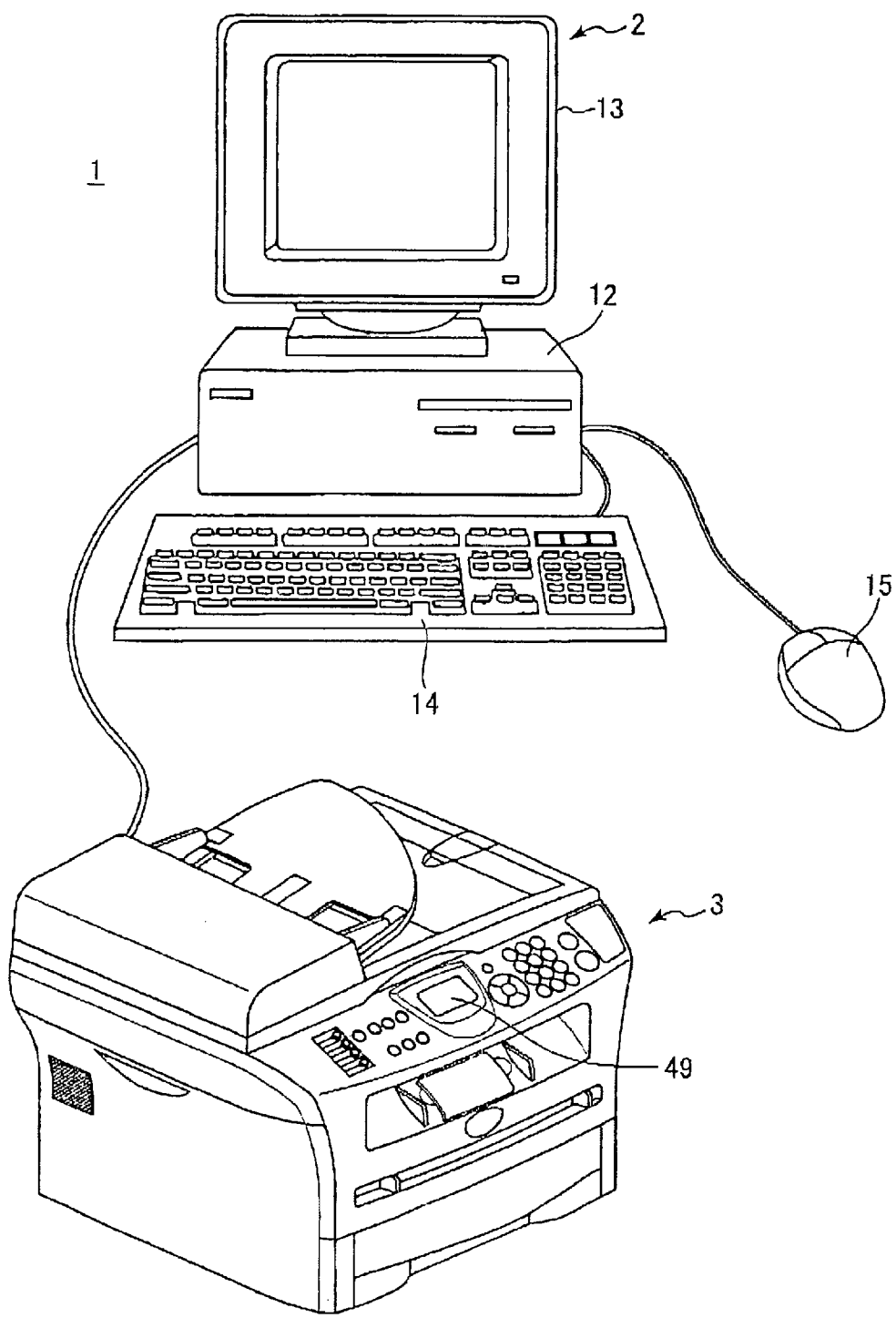
FIG. 1 is a perspective view showing the external appearance of a data-processing system.

FIG. 1 is a perspective view showing the outer appearance of the data-processing system 1. As shown in FIG. 1, the data-processing system 1 is basically configured of the PC 2, and the multifunction peripheral 3 connected to the PC 2. The PC 2 and multifunction peripheral 3 are connected by a LAN capable, universal Serial Bus (USB) cable, or the like and can communicate bi-directionally.

An operating system (OS) such as Windows (registered trademark), Linux (registered trademark), or MacOS (registered trademark) is installed on both the PC 2 and multifunction peripheral 3 to provide basic functions shared by the applications, such as input/output functions, and a function to access storage devices. Functions provided by the OS that are particularly useful in the present invention include a function for sharing folders among devices on the same network, and a function for allowing or denying access to the shared files.

Since the functions provided by the various OS's described above are well known in the art, a detailed description of these functions will not be provided. In the following description, it will be assumed that Windows (registered trademark) is installed on both the PC 2 and multifunction peripheral 3 and provides various functions (Application Programming Interface (API)).

The multifunction peripheral 3 is also provided with a liquid crystal display (LCD) 49 having a backlight for illuminating the display screen from the back surface.

Figure 2:
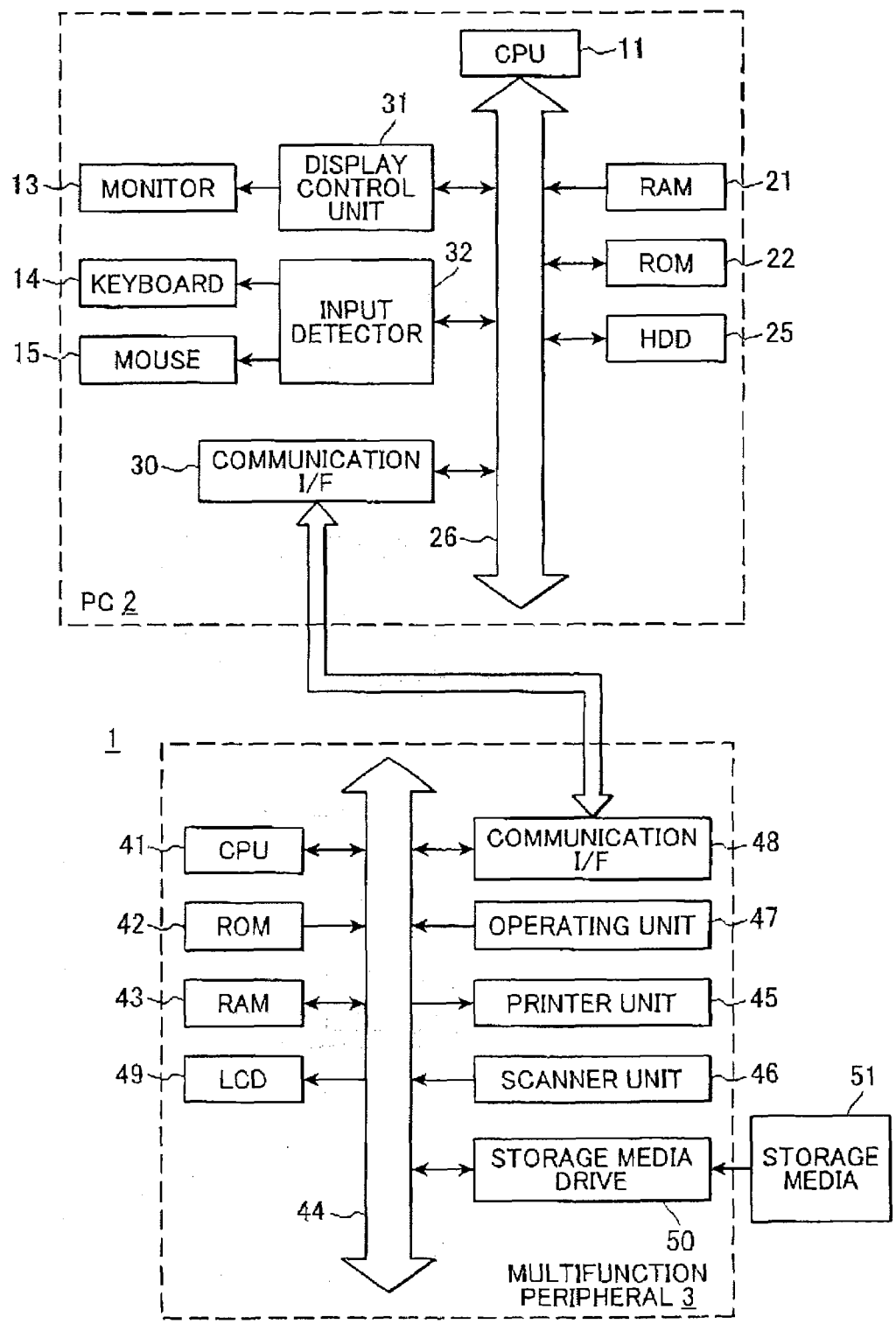
FIG. 2 is a block diagram showing the internal structure of the data-processing system.

FIG. 2 is a block diagram showing the internal structure of the data-processing system 1. As shown in FIGS. 1 and 2, the PC 2 includes a main body 12 provided with a CPU 11, a monitor 13, a keyboard 14, and a mouse 15. The monitor 13, keyboard 14, and mouse 15 are connected to the main body 12 by cables.

The CPU 11 is connected through a bus 26 to a RAN 21 for temporarily storing results of computations performed by the CPU 11, a ROM 22 storing BIOS and other programs executed by the CPU 11, and a hard disk drive (HDD) 25 serving as a data storage device. The ROM 22 and HDD 25 store various programs and the like executed by the CPU 11 to implement the processes described later.

The CPU 11 is also connected via the bus 26 to a communication interface 30 for communicating with the multifunction peripheral 3 and other devices, a display control unit 31 for controlling operating screens displayed for the user on the monitor 13, and an input detector 32 connected to the keyboard 14 and mouse 15 for detecting user input on these devices.

As described above, the PC 2 and multifunction peripheral 3 are connected to each other via a LAN cable, USB cable, or the like so as to be capable of communicating bi-directionally. The PC 2 recognizes the multifunction peripheral 3 as a network drive in the case of a LAN cable or a device having removable storage area in the case of a USB cable, and can access the folder structure constructed by the multifunction peripheral 3. The PC 2 also displays icons corresponding to the folder structure on the multifunction peripheral 3 and possesses a function for copying (transmitting) files to folders on the multifunction peripheral 3 by dragging and dropping icons corresponding to the files on icons corresponding to the folders.

The multifunction peripheral 3 includes a CPU 41, a ROM 42, a RAM 43, a printer unit 45, a scanner unit 46, an operating unit 47, a communication interface 48, the LCD 49, and a storage media drive 5C, all of which are connected via a bus 44. The ROM 42 stores various programs executed by the CPU 41 for implementing processes described later. Areas for saving and processing data scanned by the scanner unit 46 and the like are allocated in the RAM 43. The printer unit 45 and scanner unit 46 implement a printer function and scanner function, respectively, and together implement a copy function by executing both the printer function and scanner function.

The printer unit 45 has a function for notifying the CPU 41 when an error occurs during printing, including a description of the error (out-of-ink and paper jam, for example) and whether the printer unit 45 can recover from the error. The printer unit 45 also has a function for notifying the CPU 41 when printing succeeded or failed.

The operating unit 47 is configured of a control panel having various buttons and the like that the user can operate to configure settings for direct printing, for example. The communication interface 48 implements communications between the multifunction peripheral 3 and the PC 2 or other external device. A storage medium 51 can be inserted into the storage media drive 50. The storage medium 51 stores the vendor format PDF file.

Figure 3:
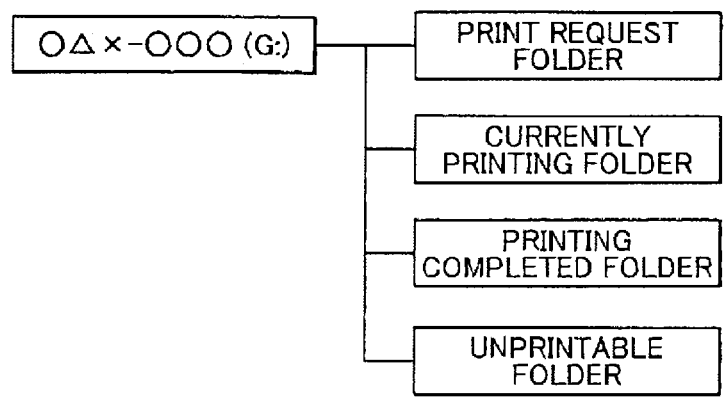
FIG. 3 is an explanatory diagram illustrating the folder structure on a multifunction peripheral.

The multifunction peripheral 3 constructs a folder structure, such as that shown in FIG. 3. As described earlier, the PC 2 can access this folder structure. The folder structure shown in FIG. 3 includes a folder "○ΔX-○○○(G:))" signifying the multifunction peripheral 3, and under this folder hierarchically a Print Request folder, a Currently Printing folder, a Printing Completed folder, and an Unprintable folder.

The user of the PC 2 drags and drops image files that the user wishes to print directly with the multifunction peripheral 3 in the Print Request folder. The multifunction peripheral 3 writes image files that car be printed directly in the Currently Printing folder in a format by which the filename can be recognized. The multifunction peripheral 3 writes image files to the Printing Completed folder in a format for recognizing the filename after a direct printing operation has been completed for the image files. The multifunction peripheral 3 writes image files that cannot be printed directly in the Unprintable folder in a format for recognizing the filename.

<Screen Displays on the PC 2>

Next, the configuration of windows displayed on the PC 2 according to the first embodiment will be described with reference to the drawings.

Figure 4:
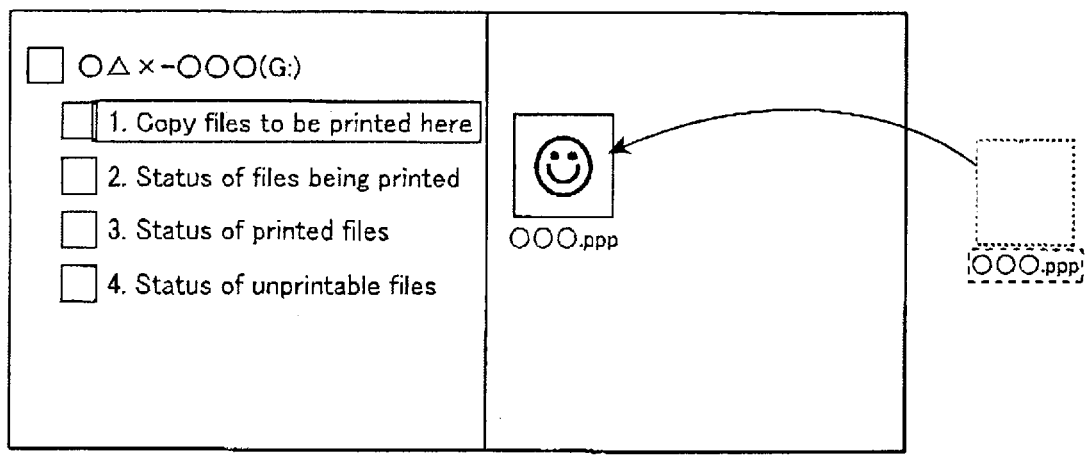
FIG. 4 is an explanatory diagram showing an example display of a window on a PC for direct printing.

FIG. 4 shows an example of a window displayed on the monitor of the PC 2 when the user of the PC 2 starts Windows (registered trademark) and subsequently uses Explorer (registered trademark), which is standard software provided in Windows, to access the folder structure on the multifunction peripheral 3 shown in FIG. 3.

In the example of FIG. 4 under the folder signifying the multifunction peripheral 3, the Explorer window displays the Print Request folder having the folder name "1. Copy files to be printed here," the Currently Printing folder having the folder name "2. Status of files being printed," the Printing Completed folder having the folder name "3. Status of printed files," and the Unprintable folder having the folder name "4. Status of unprintable files."

The user of the PC 2 can instruct the multifunction peripheral 3 to perform a direct print by dragging and dropping the image file "○○○.ppp" for example, to the Print Request folder.

FIGS. 5A-5D show examples of windows displayed on the monitor of the PC 2 when the user of the PC 2 uses Explorer to check the progress of a direct printing operation.

Figure 5A:
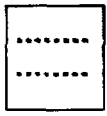
FIGS. 5A to 5D are explanatory diagrams each showing an example display of a window on the PC displaying the progress status for a direct printing operation.

FIG. 5A is an explanatory diagram of a status window displayed when the user accesses the Currently Printing folder. The status includes the filename "○○○.ppp is currently printing.txt."

Figure 5B:
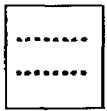

FIG. 5B shows an explanatory diagram of a status window displayed when the user access the Currently Printing folder. The status includes the filename "○○○.ppp has been canceled.txt." In this way, the user can easily see that printing has been canceled for the file requested by the user.

Figure 5C:

FIG. 5C is an explanatory diagram of a status window displayed when the user accesses the Printing Completed folder. The status includes the filename "○○○.ppp was printed successfully.txt." In this way, the user can easily learn that the file requested by the user was successfully printed.

Figure 5D:
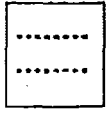

FIG. 5D is an explanatory diagram of a status window displayed when the user accesses the Unprintable folder. The status includes the filename "○○○.ppp could not be printed.txt." In this way, the user can easily see that the file requested by the user could not be printed.

FIGS. 6A to 6D are examples of file contents displayed on the PC monitor when the user of the PC 2 checks details of the progress status for a direct printing operation.

FIG. 6A is an explanatory diagram showing the status included in the contents (text 111A) of the file "◯◯◯.ppp is currently printing.txt" shown in FIG. 5A when the user double-clicks on this file. In this way, the user can easily view the detailed status for the file being printed to determine when the printing request was received.

FIG. 6B is an explanatory diagram showing the status included in the contents (text 111B) of the file "◯◯◯.ppp has been canceled.txt" shown in FIG. 5B when the user double-clicks on this file. In this way, the user can easily view details of a file for which printing was canceled, including the reason printing was canceled and actions that can be taken to recover from the error.

FIG. 6C is an explanatory diagram showing the status included in the contents (text 111C) of the file "◯◯◯.ppp was printed successfully.txt" shown in FIG. 5C when the user double-clicks on this file. In this way, the user can easily view details of the status for files that were, printed successfully, such as when printing was completed.

FIG. 6D is an explanatory diagram showing the status included in the contents (text 111D) of the file "◯◯◯.ppp could not be printed.txt" shown in FIG. 5(D) when the user double-clicks on this file. In this way, the user can easily view details of the status for files that could not be printed, such as the reason the files could not be printed.

<Operations>

Next, operations of the PC 2 and multifunction peripheral 3 having the above hardware structure will be described. The following description covers a process executed by the PC 2 and multifunction peripheral 3 for receiving a direct printing request from the user and displaying data indicating the printing progress on the monitor of the PC 2 through Explorer.

Figure 7:
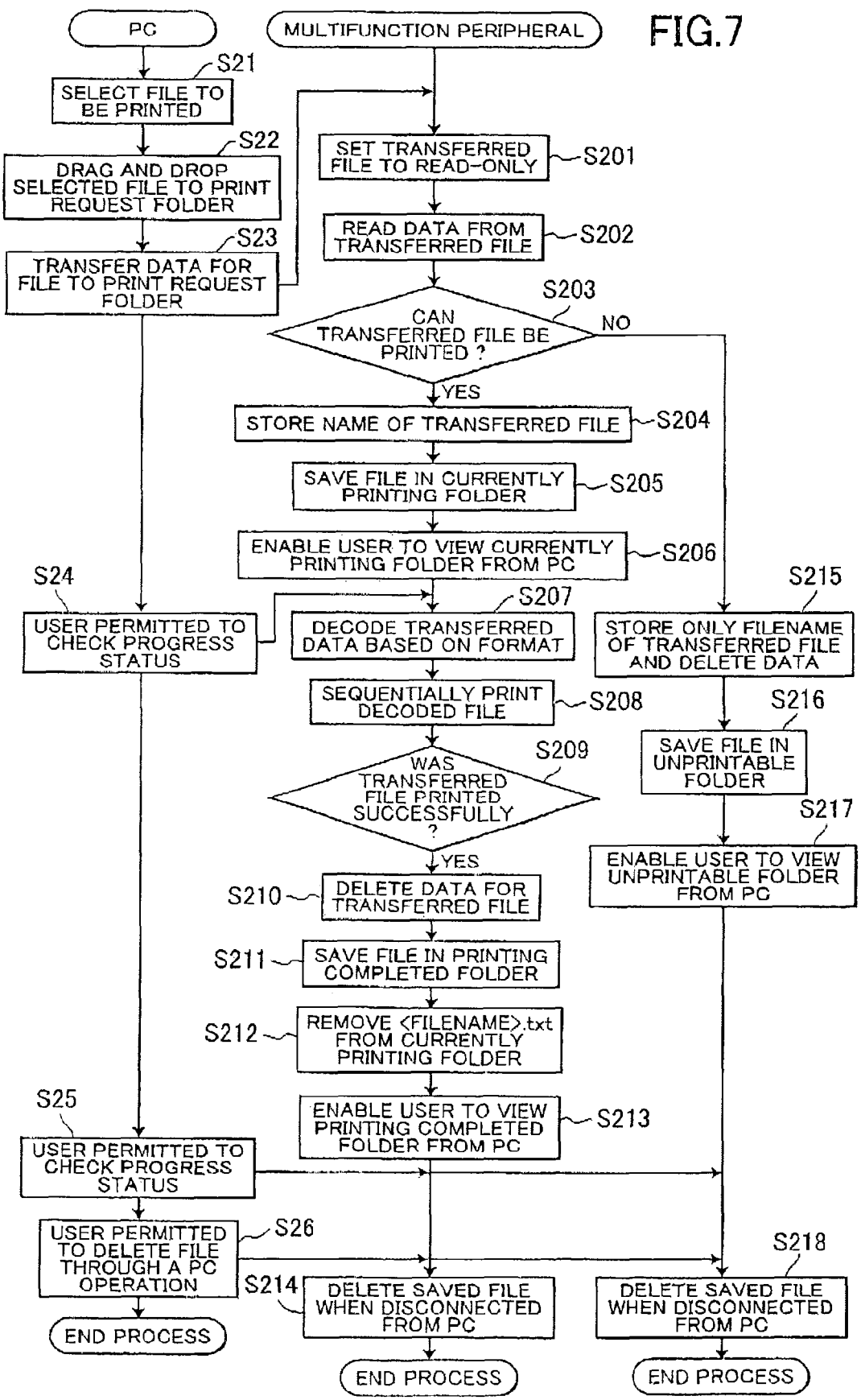
FIG. 7 is a flowchart illustrating steps in a direct printing process according to a first embodiment.

FIG. 7 is a flowchart illustrating steps in the process executed by the PC 2 and multifunction peripheral 3 in the data-processing system 1 according to the first embodiment.

At the beginning of the process in FIG. 7, the user of the PC 2 has already started Windows and Explorer and has accessed the folder structure on the multifunction peripheral 3 through Explorer to display the window shown in FIG. 4.

In S21 of FIG. 7 the CPU 11 of the PC 2 receives a user operation to select a file that the user wishes to print (for example, a mouse operation to click on the file) and highlights the file based on this operation. In S22 the CPU 11 receives a user operation to drag and drop the selected file to the Print Request folder (see FIG. 3). After receiving this drag and drop operation, in S23 the CPU 11 sequentially transfers data for the file selected by the drag and drop operation in S22 to the multifunction peripheral 3.

On the multifunction peripheral 3 side, the process in FIG. 7 begins after the power to the multifunction peripheral 3 is turned on and the CPU 41 has entered a standby state to wait for an access from an external device.

After the PC 2 has transferred a selected file to the Print Request folder in S23, in S201 the CPU 41 sets the transferred file (and/or the Print Request folder) to read-only, thereby preventing the transferred file from being deleted from the multifunction peripheral 3. In S202 the CPU 41 sequentially reads data of each transferred file to the RAM 43. In S203 the CPU 41 determines whether the transferred file can be printed based on the extension or header data on the file. In this case, the CPU 41 determines that the file can be printed if the transferred file is a JPEG file or a vendor format PDF file (the determination process is described later with reference to FIG. 8).

After determining that the transferred file can be printed, i.e., that the transferred file is of the JPEG format or the PDF vendor format (S203: YES), in S204 the CPU 41 stores the filename of the transferred file ("◯◯◯.ppp", for example) and saves a file ("~.txt") in the Currently Printing folder indicating that the file having the filename stored in S204 is being printed (see FIGS. 3 and 5A).

If a file being stored in the Currently Printing folder has the same name as another file already stored in the folder, sequential numbers can be added to the filenames, for example, to avoid duplicate filenames. This same process is performed in the second embodiment when attempting to write a file indicating the progress status of a printing operation when a file with the same filename already exists.

In S206 the CPU 41 configures the multifunction peripheral 3 to return any filenames or content in the Currently Printing folder (such as the text 111A shown in FIG. 6A) when requested from the PC 2 so that the user of the PC 2 can view this data. Hence, the user can check the progress of a direct printing operation from the PC 2 side (see S24). In S207 the CPU 41 decodes the transferred file according to its format and in S208 prints the decoded transfer file using the printer unit 45.

If a non-recoverable error, such as a paper jam or out-of-ink error, occurs in the printer unit 45 during printing, the CPU 41 saves a file in the Currently Printing folder indicating that the printing operation on the transferred file was canceled at that time (see FIGS. 3 and 5B). Alternatively, the contents of the file already saved in the Currently Printing folder can be updated to indicate that printing was canceled. When a non-recoverable error occurs on the printer unit 45, this event is handled as a failed printing process in the determination of S209 described later.

In S209 the CPU 41 determines whether the transferred file was printed successfully. If the transferred file was printed successfully (S209: YES), then in S210 the CPU 41 deletes data for the transferred file from the RAM 43. In S211 the CPU 41 saves a file in the Printing Completed folder indicating that the transferred file was printed successfully (see FIGS. 3 and 5C).

In S212 the CPU 41 deletes the filename that was saved in the Currently Printing folder in S204. The CPU 41 deletes this file a prescribed time after determining in S209 that the transferred file was printed successfully.

In S213 the CPU 41 enables the user to view the contents of the Printing Completed folder from the PC 2 (see the text 111C in FIG. 6C). Accordingly, the user can check the progress status of a direct printing operation from the PC 2 side (see S25). By performing an operation on the PC 2, the user can also delete a filename or a file that was saved in the Printing Completed folder in S211. If the user does not perform an operation to delete the file at this time, in S214 the CPU 41 deletes the filename stored in the Printing Completed folder in S211 when access by the PC 2 ends, thereby preventing the accumulation of unchecked files. Alternatively, the CPU 41 may delete a filename when a prescribed time has elapsed since the CPU 41 determined in S209 that the transferred file was printed successfully.

However, if the CPU 41 determines in S203 that the transferred file cannot be printed, i.e., that the transferred file is not a JPEG file or a vendor formal PDF file (S203: NO) or if the CPU 41 determines in S209 that printing of the transferred file failed (S209: NO), in S215 the CPU 41 saves the filename of the transferred file while deleting the data for the transferred file from the RAM 43, and in S216 saves a file indicating that the file having the filename saved in S215 could not be printed in the Unprintable folder (see FIGS. 3 and 5D).

In S217 the CPU 41 enables the user to view contents or the Unprintable folder from the PC 2 (see the text 111D in FIG. 6D). Accordingly, the user can check the progress status of a direct printing operation from the PC 2 side (see S25).

By performing an operation on the PC 2, the user can delete a filename saved in the Unprintable folder in S216. If the user does not perform an operation to delete the file, in S218 the CPU 41 deletes the filename saved in the Unprintable folder in S216 when access by the PC 2 ends, thereby preventing an accumulation of unchecked files. Alternatively, the CPU 41 may delete the file upon determining in S203 that the file cannot be printed or when a prescribed time has elapsed after determining in S209 that printing of the transferred file failed.

If the printing was cancelled during execution of the steps of the flowchart shown in FIG. 7, the execution of the steps may be forcibly interrupted and resumed when the cause of print cancellation is solved.

In this way, the data-processing system 1 having the hardware structure described above can receive requests from the user to perform direct printing operations and can display data showing the progress of the operation on the monitor of the PC 2 via the standard software Explorer.

Figure 8:
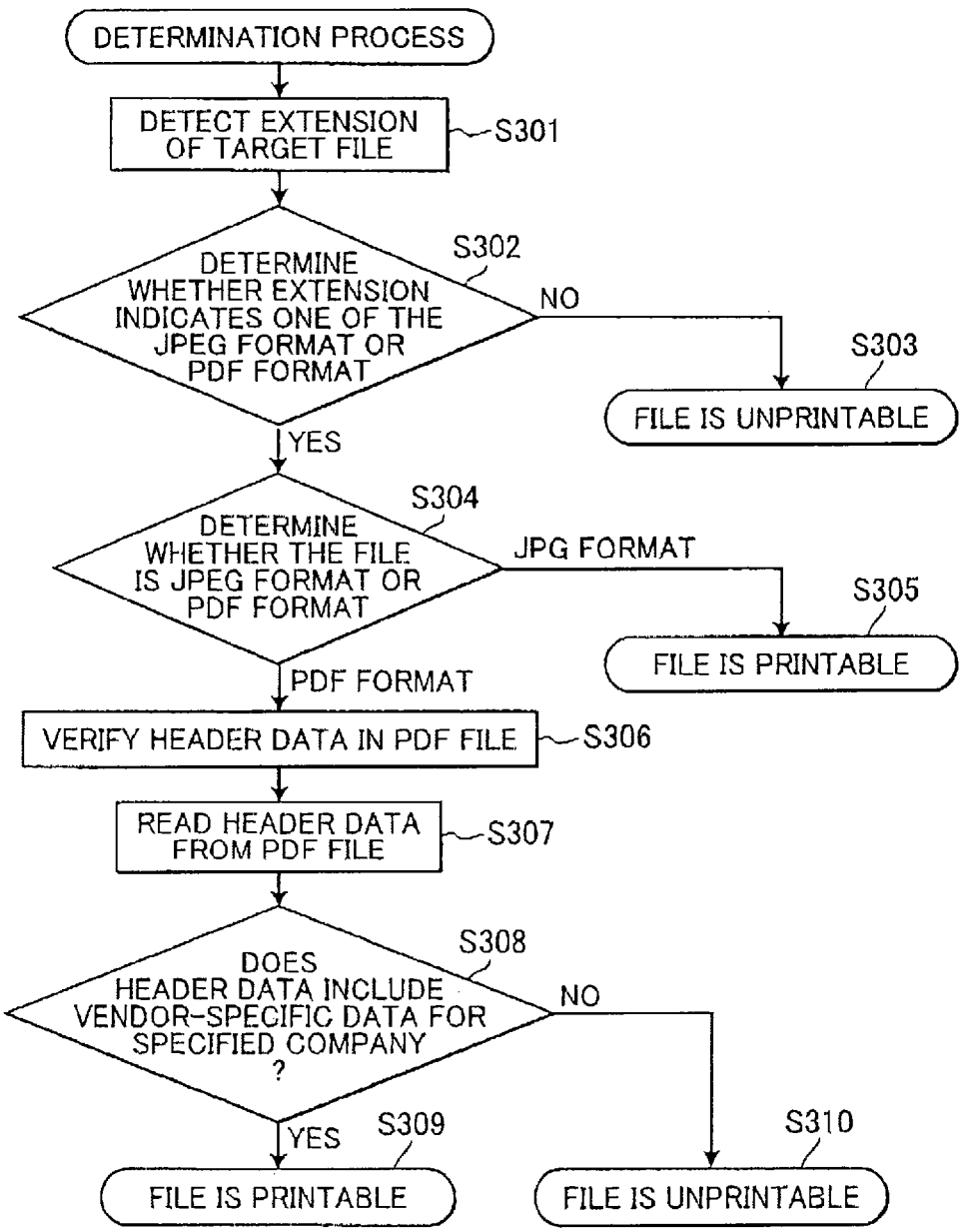
FIG. 8 is a flowchart illustrating steps in a process for determining whether a file can be printed.

Next, the method that the multifunction peripheral 3 uses in S203 to determine whether a file transferred from the PC 2 can be printed (whether the file has the JPEG format or the PDF vendor format) will be described with reference to FIG. 8. FIG. 8 is a flowchart illustrating steps in the process for determining whether a file transferred from the PC 2 can be printed.

In S301 of FIG. 8, the CPU 41 identifying the extension in the target file. In S302 the CPU 41 determines whether the extension of the target file is an extension for the JPEG format or PDF format. For purposes of description, "jjj" will be used to indicate the extension of a JPEG file and "ppp" will be used to indicate the extension of a PDF file in the embodiment.

If the extension of the target file is neither a JPEG extension nor a PDF extension (S302: NO), then in S303 the CPU 41 determines that the target file cannot be printed. However, if the extension of the target file is a JPEG extension or a PDF extension (S302: YES), then in S304 the CPU 41 determines based on the extension of the target file whether the file is a JPEG format file or a PDF format file.

If the target file is a JPEG file (S304: JPEG), in S305 the CPU 41 determines that the target file can be printed. However, if the target file is a PDF file (S304: PDF), then in S306 the CPU 41 verifies the existence of header data in the target PDF file and in S307 reads the header data from the file (see FIG. 9A). In S308 the CPU 41 determines whether the header data read from the target PDF file includes vendor-specific data (see FIG. 9B).

Figure 9A:
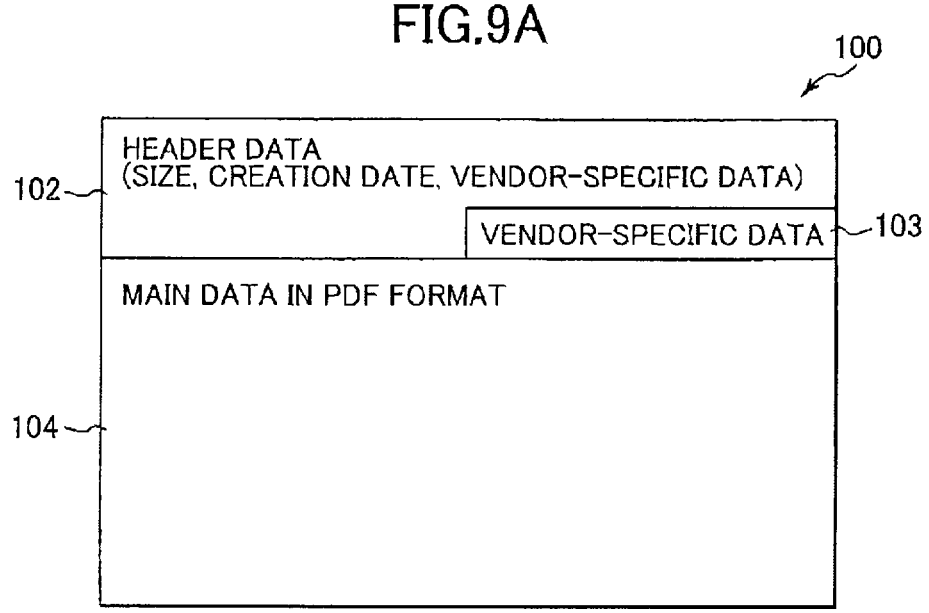
FIGS. 9A and 9B are explanatory diagrams showing the structure of a PDF file of a vendor format.

Here, a description will be given for the header data and the vendor-specific data. FIG. 9A shows a sample data structure for a vendor format PDF file. That is, a vendor format PDF file 100 is configured of a common PDF file structure including header data 102, such as data indicating the size and creation date, added to main data 104 in the PDF format, but also includes vendor-specific data 103 as header data.

Figure 9B:
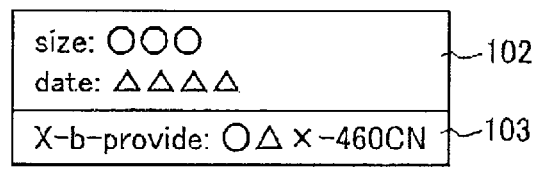

FIG. 9B shows sample content for the header data 102. As shown in FIG. 9B, the header data 102 includes "size: ○○○", indicating the size of the main file, and "data: ΔΔΔΔ", indicating the creation date of the main a file. The vendor-specific data 103 holds an ID number for the multifunction peripheral 3, such as "X-B-provide: ○ΔX-460CN," indicating that the file was created by the multifunction peripheral 3, i.e., that the file is a vendor format PDF file.

Returning to the flowchart in FIG. 8, if the header data in the target PDF file includes vendor-specific data, and the vendor-specific data indicates the specified company (S308: YES), then in S309 the CPU 41 determines that the target file can be printed. However, if the header data in the target PDF file does not include vendor-specific data or if the vendor-specific data does not indicate the specified company (S308: NO), then in S310 the CPU 41 determines that the target file cannot be printed.

In this way, the multifunction peripheral 3 determines whether a file transferred from the PC 2 can be printed, i.e., whether the file is a JPEG file or a vendor format PDF file.

Figure 10:
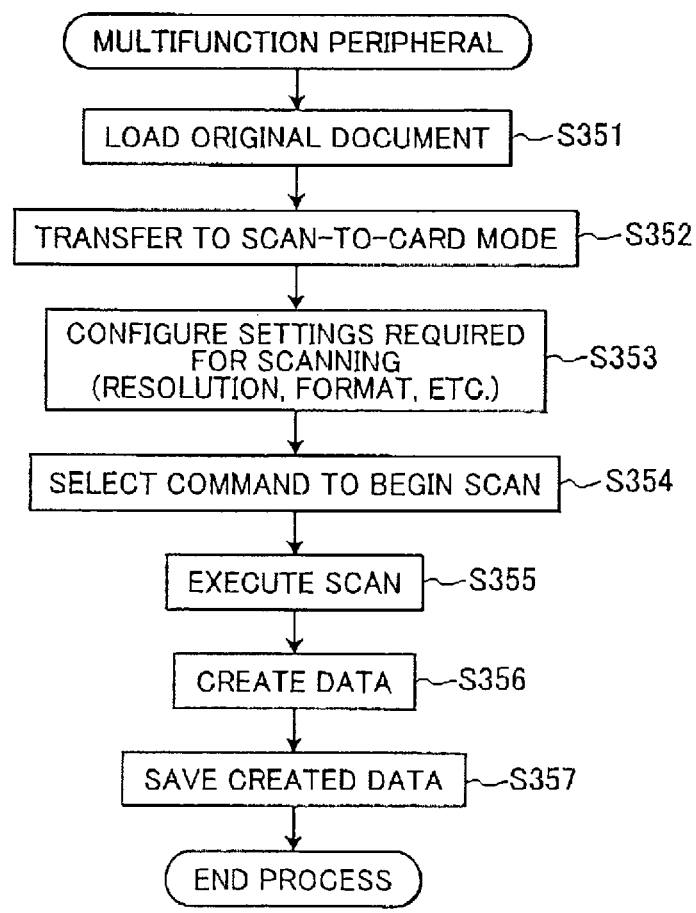
FIG. 10 is a flowchart illustrating steps in a process for creating the PDF file of a vendor format.

Next, the method of creating a vendor format PDF file on the multifunction peripheral 3 will be described with reference to FIG. 10. FIG. 10 is a flowchart illustrating steps in the process by which the multifunction peripheral 3 creates a vendor format PDF file.

At the starting point of the flowchart in FIG. 10, the multifunction peripheral 3 is in a standby state waiting for operations from the user. When the user sets an original document in the scanner unit 46, in S351 the CPU 41 of the multifunction peripheral 3 detects the document. After receiving a user command inputted via the operating unit 47, in S352 the CPU 41 shifts to the scan-to-card mode for scanning an original document with the scanner unit 46 storing the scanned data in an external storage medium 51 inserted in the storage media drive 50. In S353 the CPU 41 configures settings necessary for scanning (resolution, format, etc.) based on user instructions. In S354 the CPU 41 receives a command inputted by the user to begin scanning, and in S355 activates the scanner unit 46 to perform a scan.

In S356 the CPU 41 encodes the scanned data acquired in S355 to create the vendor format PDF file shown in FIGS. 9A and 9S. In S357 the CPU 41 stores this file data in the storage medium 51 mounted in the storage media drive 50.

In this way, the multifunction peripheral 3 creates a specified company PDF file.

As described in detail above, when the user of the PC 2 wishes to directly print an image file and drags and drops the image file on an icon indicating the Print Request folder of the multifunction peripheral 3 that is displayed in Explorer on the PC 2 (S22), the image file is copied (transmitted to the Print Request folder provided in the folder structure of the multifunction peripheral 3 (S23, S202) and the multifunction peripheral 3 performs a direct print of the transferred image file (S208). In this way, the user can instruct the multifunction peripheral 3 to directly print a file from the PC 2 using Explorer, which is a standard application of the operating system.

If the user accesses the Currently Printing folder, Printing Completed folder, or Unprintable folder provided in the folder structure on the multifunction peripheral 3 using Explorer in order to check the progress of the direct printing operation, the filename or file content in the accessed folder is copied (transmitted) from the multifunction peripheral 3 to the PC 2 (S24, S25, S206, S213, S217, S411, S418, S422).

Since the user can view the filename or file content copied from the multifunction peripheral 3 on the PC 2, the data-processing system 1 allows the user to confirm the progress status of a direct printing operation using the standard application Explorer.

Second Embodiment

Next, a second embodiment of the present invention will be described. The second embodiment differs from the first embodiment in that the multifunction peripheral 3 performs direct printing of files stored in the external storage medium 51 mounted in the storage media drive 50 of the multifunction peripheral 3.

As in the first embodiment described above, the multifunction peripheral 3 according to the second embodiment proceeds with a printing operation upon receiving a direct print command, while saving files indicating the progress status for the printing operation in prescribed folders configured on the multifunction peripheral 3. Accordingly, the user of the PC 2 can use a standard file browsing function of the PC 2 to access the files saved in the prescribed folders on the multifunction peripheral 3 in order to view data indicating the stage of progress in the direct printing operation, for example, current printing, printing canceled, printing completed, unprintable as shown in FIGS. 4, 5A-5D and 6A-6D.

As in the first embodiment described above, the multifunction peripheral 3 according to the second embodiment allows only JPEG files and vendor format PDF files as the target for direct printing. Also, the hardware structure of the PC 2 and multifunction peripheral 3 and the configuration of windows displayed on the PC 2 are identical to those described in the first embodiment.

Operations of the PC 2 and multifunction peripheral 3 according to the second embodiment having the same hardware structure as those in the first embodiment will be described for the process of receiving a direct printing request from the user and displaying data indicating the progress of the direct printing process on the monitor of the PC 2 through the standard software function Explorer.

Figure 11A:
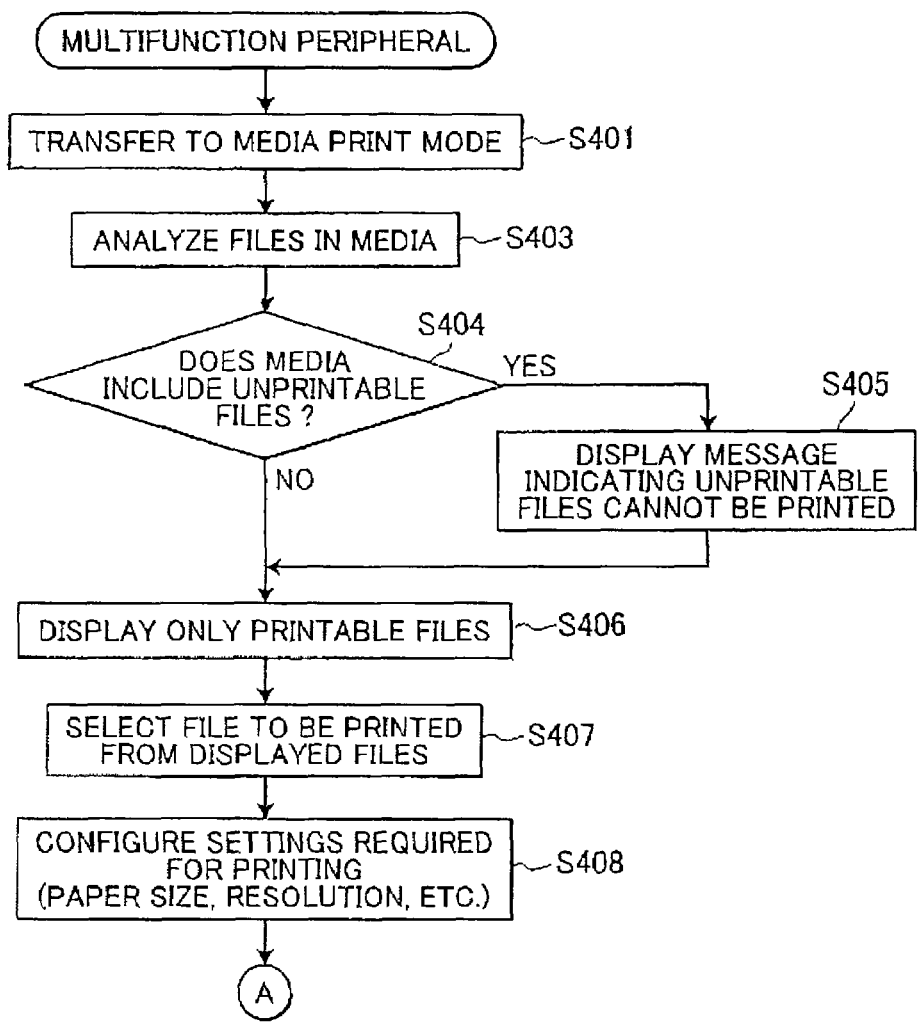

FIGS. 11A and 11B are flowcharts illustrating steps in this process executed by the multifunction peripheral 3 in the second embodiment.

At the starting point of the flowchart in FIG. 11A, the CPU 41 of the multifunction peripheral 3 is in a standby state waiting for operations by the user. Upon receiving an operation from the user to shift modes, in S401 the CPU 41 shifts to a media print mode for printing an image file in the storage medium 51 mounted in the storage media drive 50.

In S403 the CPU 41 analyzes the extension, header data, and the like for each image file in the storage medium 51. In S404 the CPU 41 determines whether the image files in the storage medium 51 include files that cannot be printed, i.e., executes the determination process shown in FIG. 8 on each image file.

Figure 12:
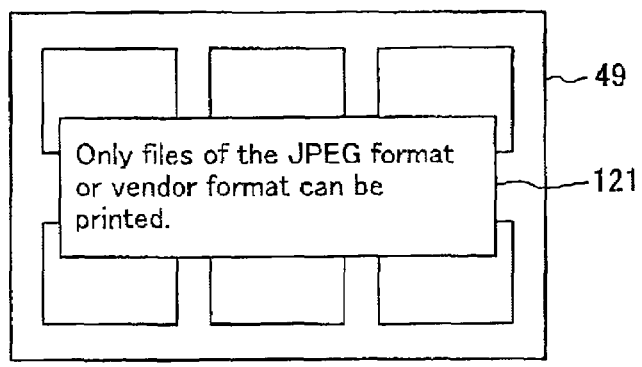
FIG. 12 is an explanatory diagram showing a displayed message indicating that a file cannot be printed.

If the CPU 41 determines that the storage medium 51 includes files that cannot be printed (S404: YES), then in S405 the CPU 41 displays a message on the LCD 49 indicating that the files in question cannot be printed. At this time, a window 121, such as a temporary popup window, is displayed on the LCD 49. As shown in the example of FIG. 12, the window 121 includes a message such as "Only files of the JPEG format or vendor format can be printed." However, if the storage medium 51 does not include files that cannot be printed (S404: NO), no display is particularly necessary.

Figure 13A:
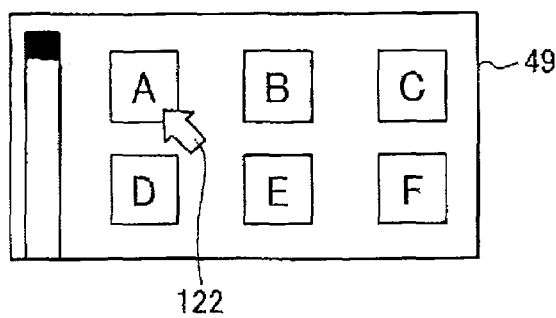
FIGS. 13A to 13C are explanatory diagrams each showing a display distinguishing files that can be printed from files that cannot be printed.

In S406 the CPU 41 of the multifunction peripheral 3 displays on the LCD 49 only files that can be printed directly. For example, as illustrated in FIGS. 13A and 13B, the CPU 41 displays thumbnail images on the LCD 49 for files that can be printed directly (the boxes around alphabetical characters in FIGS. 13A and 13B).

Figure 13B:
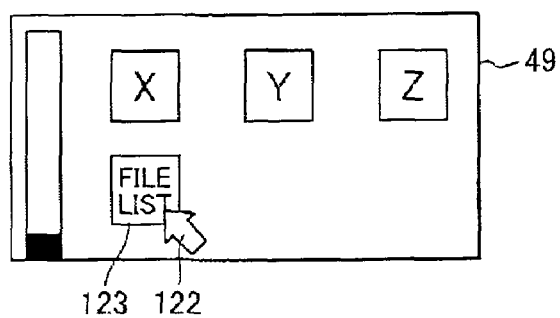
Figure 13C:
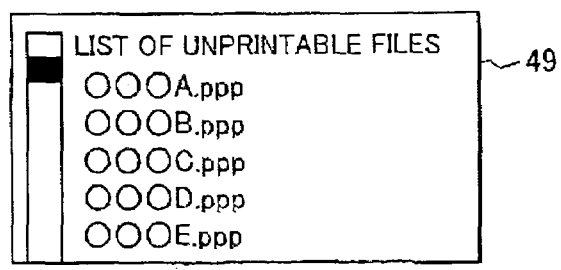

As shown in FIG. 13B, the display on the LCD 49 may also include a File List button 123, for example. If the user operates a pointer 122 to open the File List button 123, the CPU 41 can be configured to display a list of files that cannot be directly printed, as shown in FIG. 13C.

Upon receiving input for a desired file selected by the user, in S407 the CPU 41 identifies the image file based on the selection operation and sequentially reads data for the identified file to the RAM 43. In S408 the CPU 41 configures settings required for printing the file selected in S407, such as paper size and resolution.

In S409 of FIG. 11B, the CPU 41 stores the filename for the selected file ("◯◯◯.ppp", for example). In S410 the CPU 41 saves a file ("~.txt") in the Currently Printing folder indicating that the file having the filename stored in S409 is being printed (see FIGS. 3 and 5A).

In S411 the CPU 41 configures the multifunction peripheral 3 to return the filenames and content in the Currently Printing folder (see the text 111A in FIG. 6A) when a request is received from the PC 2 so that the user can view this data. Hence, the user can confirm the state of progress in a direct printing operation from the PC 2 side.

In S412 the CPU 41 decodes the selected file according to the format. In S413 the CPU 41 controls the printer unit 45 to print the decoded file. When a non-recoverable error, such as a paper jam or an out-of-ink errors occurs during printing on the printer unit 45, the CPU 41 saves a file in the Currently Printing folder indicating that printing of the transferred file has been suspended at that time (see FIGS. 3 and 5B). Alternatively, the CPU 41 may update the contents of the file already stored in the Currently Printing folder to indicate that printing has been suspended. When a non-recoverable error occurs on the printer unit 45, the CPU 41 treats the printing operation as a failed operation in the determination of S414 described next.

In S414 the CPU 41 determines whether the selected file was printed successfully. If the selected file was printed successfully (S414: YES), in S415 the CPU 41 deletes data for the transferred file from the PAM 43. In S416 the CPU 41 saves a file in the Printing Completed folder indicating that printing of the selected file was completed (see FIGS. 3 and 5C).

In S417 the CPU 41 deletes the filename saved in the Currently Printing folder in S410. The CPU 41 may delete the filename when a prescribed time has elapsed after determining in S414 that the transferred file was printed successfully.

In S418 the CPU 41 enables the user to view the content of the Printing Completed folder from the PC 2 (see the text 111C in FIG. 6C). In this way, the user can confirm the progress of a direct printing operation from the PC 2 side.

By performing an operation on the PC 2, the user can also delete a filename saved in the Printing Completed folder in S416. If the user does not perform an operation to delete the file, in S419 the CPU 41 deletes the filename saved in the Printing Completed folder in S416 when access by the PC 2 ends, thereby preventing an accumulation of unchecked files. Alternatively, the CPU 41 may delete the file when a prescribed time has elapsed after determining in S414 that the transferred file was printed successfully.

However, if the CPU 41 determines in S414 that printing of the transferred file failed (S414: NO), in S420 the CPU 41 saves the filename of the transferred file while deleting the data for the transferred file from the RAM 43, and in S421 saves a file in the Unprintable folder indicating that the file having the filename saved in S420 could not be printed (see FIGS. 3 and 5D).

In S422 the CPU 41 enables the user to view contents of the Unprintable folder from the PC 2 (see the text 111D in FIG. 6D). Accordingly, the user can check the progress status of a direct printing operation from the PC 2 side.

By performing an operation on the PC 2, the user can also delete a filename saved in the Unprintable folder in S421. If the user does not perform an operation to delete the file, in S423 the CPU 41 deletes the filename saved in the Unprintable folder in S421 when access by the PC 2 ends, thereby preventing an accumulation of unchecked files. Alternatively, the CPU 41 may delete the file when a prescribed time has elapsed after determining in S414 that printing of the transferred file failed.

In this way, the data-processing system 1 having the same hardware structure as described in the first embodiment can receive requests from the user to perform direct printing operations and can display data showing the progress of the operation on the monitor of the PC 2 via the standard software Explorer.

With the data-processing system 1 according to the second embodiment described above, the user can select an image file stored on the storage medium 51 to be printed directly (S407), and the multifunction peripheral 3 directly prints the selected image file (S413).

If the user accesses the Currently Printing folder, Printing Completed folder, or Unprintable folder provided in the folder structure on the multifunction peripheral 3 using Explorer in order to check the progress of the direct printing operation, the filename or file content in the accessed folder is copied (transmitted) from the multifunction peripheral 3 to the PC 2 (S24, S25, S206, S213, S217, S411, S418, S422).

Since the user can view the filename or file content copied from the multifunction peripheral 3 on the PC 2, the data-processing system 1 of the preferred embodiment allows the user to confirm the progress status of a direct printing operation using the standard application Explorer.

VARIATIONS OF THE EMBODIMENTS

While the invention has been described in detail with reference to specific embodiments thereof, it would be apparent to those skilled in the art that many modifications and variations may be made therein without departing from the spirit of the invention, the scope of which is defined by the attached claims.

For example, when the user issues a request from the PC 2 to the multifunction peripheral 3 to access the folder "○ΔX-○○○(G:)" signifying the multifunction peripheral 3, the multifunction peripheral 3 may transfer the filenames and file content in the Currently Printing folder, Printing Completed folder, or Unprintable folder to the PC 2. In this way, the user can learn the progress status of the printing process all at once, without accessing the folder signifying the multifunction peripheral 3.

For example, in the first embodiment described above, the user issues a request from the PC 2 to perform a direct print by copying an image file into the Print Request folder. However, the multifunction peripheral 3 may be configured to acquire the image file and print the file directly when a file describing the location (URL) of an image file stored on a PC or other device is copied to the Print Request folder.

The multifunction peripheral 3 may also be configured to perform a direct printing operation when an image file or a file describing the location of an image file is copied to the folder signifying the multifunction peripheral 3.

FIGS. 13A, 13B, and 13C according to the second embodiment show an example of separately displaying files that can be directly printed and files that cannot be directly printed. Here, it is also possible to add icons or the like to the display to distinguish files that can be directly printed from files that cannot, or to display only files that can be directly printed.

Further, while FIG. 13C in the second embodiment displays the filenames of files that cannot be directly printed, the display may include the actual thumbnail images of files that cannot be directly printed.

In the embodiments described above, if an image file cannot be printed on the multifunction peripheral 3 (S203: NO), the CPU 41 deletes data for the image file from the RAM 43 (S215). However, the CPU 41 may instead preserve the image file data rather than deleting this data from the RAM 43.

In the embodiments described above, after the CPU 41 of the multifunction peripheral 3 determines that printing succeeded or failed (S209, S414), the CPU 41 deletes data for the image file targeted in this determination from the RAM 43 (S210, S215, S415, and S420). However, the CPU 41 may instead preserve the image file data rather than deleting this data from the RAN 43.

By preserving data for image files targeted for direct printing rather than deleting this data from the RAM 43, the multifunction peripheral 3 can transmit data of the image file targeted for direct printing to the PC 2 after completing the direct printing operation. It can be particularly useful to return the image file targeted for direct printing to the PC 2, even though the image file was initially transferred from the PC 2 if the user mistakenly moves or deletes the image file on the PC 2.

In the embodiments described above, the folder structure of the multifunction peripheral 3 shown in FIG. 3 has a Currently Printing folder, Printing Completed folder, and Unprintable folder arranged beneath the folder "○ΔX-○○○(G:)" signifying the multifunction peripheral 3, and the multifunction peripheral 3 is configured to save files indicating progress of the printing processes in these respective folders in S205, S211, S216, S410, S416, S421, and the like.

Figure 14A:
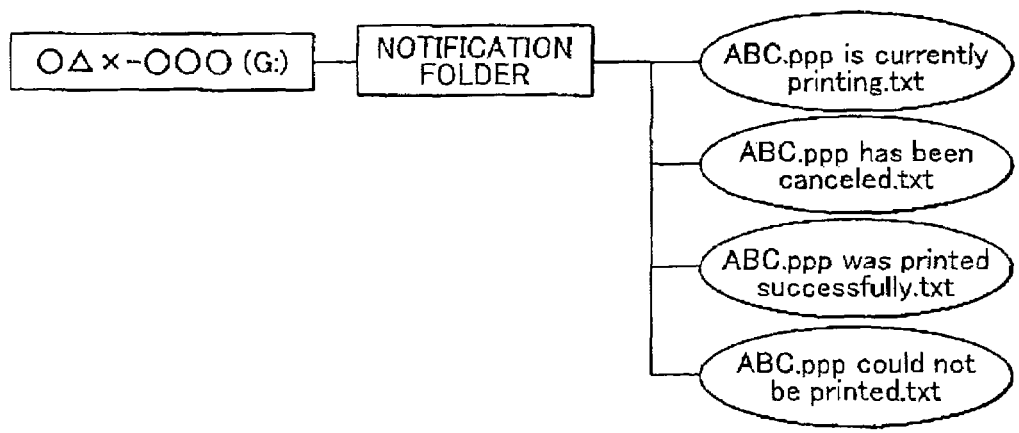
FIGS. 14A and 14B are explanatory diagrams each showing the folder structure on a multifunction peripheral.

Alternatively, it is possible to provide a notification folder for saving notification files immediately beneath the folder "○ΔX-○○○(G:)" signifying the multifunction peripheral 3, as shown in the folder structure of FIG. 14A, and to configure the multifunction peripheral 3 to save files indicating the progress status of the printing processes in the notification folder in S205, S211, S216, S410, S416, S421, and the like. With this configuration, the user of the PC 2 can easily confirm the status of a printing process by accessing the notification folder.

The same effects can be obtained without the notification folder, simply by saving the files indicating the progress status of printing processes in the folder signifying the multifunction peripheral 3.

Alternatively, the multifunction peripheral 3 may be configured to save files indicating the progress status of printing processes in the Print Request folder. With this construction, the user of the PC 2 can easily confirm the status of printing processes simply by reaccessing the same Print Request folder accessed to request a direct printing operation.

Figure 14B:
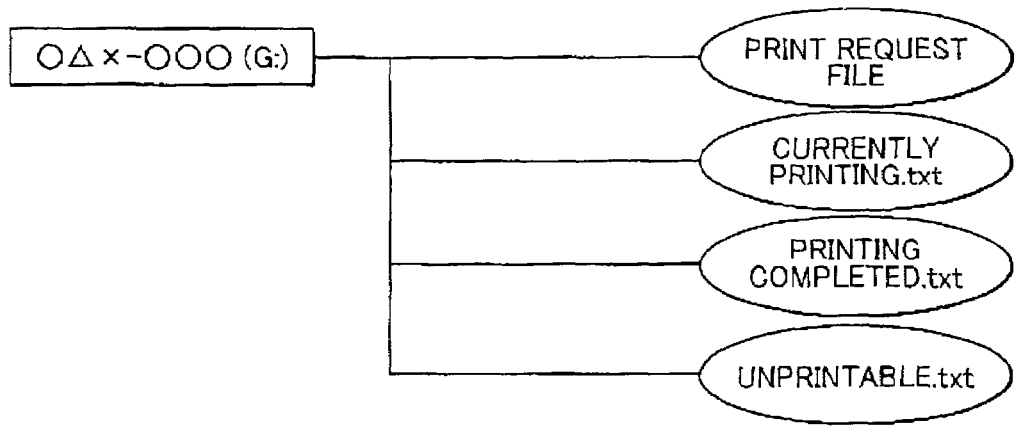

As shown in FIG. 14B, it is also possible to provide a text file with the filename "currently printing.txt" and to write content (the text 111A, 111B, or the like) indicating the printing status of an image file (currently printing or printing canceled, for example) in this text file. Another text file may be provided with the filename "printing completed.txt," with the date-processing system 1 configured to write content (the text 111C, for example) indicating the printing status of the image file (printing completed, for example) to this text file. Another text file may be provided with the filename "unprintable.txt," with the multifunction peripheral 3 configured to write content (the text 111D, for example) indicating the printing status of the image file (unprintable) to this text file.

With this configuration, the user of the PC 2 can easily confirm the progress status simply by displaying the content of the text files.

Even when using these text files, the multifunction peripheral 3 may be configured to save the text files in the respective Currently Printing folder, Printing Completed folder, and Unprintable folder. Also, the multifunction peripheral 3 may be configured to save these text files in the notification folder, the folder signifying the multifunction peripheral 3, or the printing request folder.

With the above configuration, text indicating the printing status of an image file is added to each text file in the processes of S205, S211, S216, S410, S416, S421, and the like. In this case, the user of the PC 2 can easily confirm the status for a plurality of printing processes at the same time simply by displaying the content of the text files.

While the multifunction peripheral 3 is configured to save files having filenames indicating the printing status of image files in S205, S211, S216, S410, S416, S421, and the like, the multifunction peripheral 3 may certainly also be configured to save folders having folder names indicating the printing status of image files. The configuration for saving folders having such folder names is not limited to that described in the embodiments. Many modifications and variations are possible.

The present invention may also certainly be applied to devices other than the multifunction peripheral 3, such as a scanner having a shared server function. In this case, a file describing scanner settings and a destination for transferring data is copied to a folder on the scanner itself, and the scanner scans an original document according to the settings in the file and transfers the scanned image data to the transfer destination.

In this example, the scanner may transfer progress data to a computer possessing a shared client function as file access data. This progress data may indicate whether an original document to be scanned has been set in the scanner, whether scanning was performed successfully, whether communication with the specified transfer destination was established, and whether the image data was transferred successfully, for example.

The present invention may also be applied to a scanner that scans an original document based on settings specified in a file and transmits the image data to the specified transfer destination when a storage medium storing a file describing the scanner settings and transfer destination is inserted in a memory slot of the scanner.

The present invention can be applied to a technology for preparing data indicating the stages of progress in data processing.

What is claimed is:

1. A data processor bi-directionally communicably connected to a host device, the data processor comprising:
    a process-executing unit configured to execute a prescribed printing process in response to a process-requested file being written into a prescribed folder; and
    a progress-status-saving unit configured to save, in a memory, progress status data having a prescribed filename in a prescribed folder having a prescribed folder name,
    wherein the progress status data describes a progress status of the prescribed printing process and the prescribed filename includes a string of characters having a meaning indicating a progress status of the prescribed printing process being executed to the process-requested file, and
    wherein the prescribed folder is included within a plurality of folders and the progress status of the prescribed printing process is classified into a plurality of categories, and
    wherein each of the plurality of folders identifies a different possible category of progress status the progress-status-saving unit saves the progress status data in a folder selected from among the plurality of folders identified by a category of the progress status from among the plurality of categories.

2. The data processor according to claim 1, wherein the progress-status-saving unit saves the progress status data in the prescribed folder in which the process-requested file is written.

3. The data processor according to claim 1, wherein the progress-status-saving unit creates a plurality of folders in one-to-one correspondence with the plurality of categories, regardless of whether the process-executing unit has executed the prescribed printing process.

4. The data processor according to claim 1, wherein the progress status of the prescribed printing process is classified into a plurality of categories, and the progress status data has contents differing depending upon a category.

5. The data processor according to claim 4, wherein the progress-status-saving unit saves the progress status data on a category-by-category basis, regardless of whether the process-executing unit has executed the prescribed printing process.

6. The data processor according to claim 1, wherein the progress-status-saving unit saves abnormality-occurrence data indicating occurrence of an abnormality when the progress status of the prescribed printing process is an abnormal state.

7. The data processor according to claim 1, further comprising a file-controlling unit configured to prevent the host device from deleting the process-requested file written in the prescribed folder from a start of execution until a completion of execution of the prescribed printing process.

8. The data processor according to claim 1, further comprising a file-controlling unit configured to prevent the host device from modifying the process-requested file written in the prescribed folder from a start of execution until a completion of execution of the prescribed printing process.

9. The data processor according to claim 1, further comprising a printing unit configured to print images on a print medium, wherein the prescribed printing process includes activating the printing unit to perform printing of the process-requested file written in the prescribed folder.

10. The data processor according to claim 1, wherein the prescribed folder name includes a string of characters having a meaning indicating a progress status of the prescribed printing process, the prescribed filename stored in the prescribed folder indicating the progress status of the prescribed printing process more precisely than an indication by the name of the prescribed folder.

11. The data processor according to claim 1, wherein:
    the process-executing unit is configured to execute a second prescribed printing process in response to a second process-requested file being written into the prescribed folder;
    the progress-status-saving unit is configured to save in the memory second progress status data having a second prescribed filename in a second prescribed folder having a second prescribed folder name, different from the prescribed folder name but included within the plurality of folders, the progress status of the second prescribed printing process being in a different category of progress status as compared to the progress status of the prescribed printing process; and
    the second prescribed filename including a second string of characters having a meaning indicating a different progress status as compared to the progress status of the prescribed printing process being executed to the process-requested file.

12. A data-processing system comprising:
a host device;
a data processor bi-directionally communicably connected to the host device, the data processor including a process-executing unit that executes a prescribed printing process by writing a process-requested file into a prescribed folder; and
a progress-status-saving unit configured to save, in a memory, progress status data having a prescribed filename in a prescribed folder having a prescribed folder name,
wherein the progress status data describes a progress status of the prescribed printing process and the prescribed filename includes a string of characters having a meaning indicating a progress status of the prescribed printing process being executed to the process-requested file, and
wherein the prescribed folder is included within a plurality of folders and the progress status of the prescribed printing process is classified into a plurality of categories, and wherein each of the plurality of folders identifies a different possible category of progress status the progress-status-saving unit saves the progress status data in a folder selected from among the plurality of folders identified by a category of the progress status from among the plurality of categories.

13. The data processing system according to claim 12, further comprising a printing unit configured to print images on a print medium, wherein the prescribed process includes activating the printing unit to perform printing of the process-requested file written in the prescribed folder.

14. A non-transitory computer program medium including a computer usable medium having readable program code embodies in the medium, the computer program product including a least one component to:
instruct execution of a prescribed printing process in response to a process-requested file being written into a prescribed folder of a data processor bi-directionally communicably connected to a computer that runs in accordance with the computer program;
classify the progress status of the prescribed process into a plurality of categories;
save progress status data having a prescribed filename in a prescribed folder having a prescribed folder name, the progress status data describing a progress status of the prescribed printing process and indicating a progress status of the prescribed printing process being executed to the process-requested file and being saved in a folder selected from among the plurality of folders identified by a category of the progress status from among the plurality of categories, wherein each of the plurality of folders identifies a different possible category of progress status of the prescribed printing process;
allow the computer to retrieve the progress status data;
wherein the prescribed filename includes a string of characters having a meaning indicating a progress status of the prescribed printing process.

15. A data processor comprising:
a communication interface configured to receive an image file transmitted from an external device; and
a controller operable under a folder structure including a print request folder in which the image file to be printed is written and a plurality of print progress folders having folder names representing sequentially changeable print progress statuses, wherein each of the plurality of print progress folders identifies a different possible one of the sequentially changeable print progress statuses, the controller being configured to:
execute a printing process based on the image file under a condition that the communication interface receives the image file transmitted from the external device; and
store a file in a selected one of the plurality of print progress folders, the file having a file name corresponding to the selected one of the plurality of progress folders and more precisely indicating a print progress status than the name of the selected one of the plurality of progress folders.

* * * * *